(12) United States Patent
Li

(10) Patent No.: US 12,289,160 B2
(45) Date of Patent: Apr. 29, 2025

(54) METHODS, SYSTEMS AND APPARATUSES FOR 5G TIME SYNCHRONIZATION

(71) Applicant: ZTE CORPORATION, Guangdong (CN)

(72) Inventor: Zhendong Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 219 days.

(21) Appl. No.: 18/174,172

(22) Filed: Feb. 24, 2023

(65) Prior Publication Data

US 2023/0291489 A1 Sep. 14, 2023

Related U.S. Application Data

(63) Continuation of application No. PCT/CN2020/119577, filed on Sep. 30, 2020.

(51) Int. Cl.
*H04W 56/00* (2009.01)
*H04J 3/06* (2006.01)

(52) U.S. Cl.
CPC ....... *H04J 3/0661* (2013.01); *H04W 56/0015* (2013.01)

(58) Field of Classification Search
CPC ...... H04J 3/0641; H04J 3/0661; H04J 3/0667; H04J 3/12; H04W 56/0015
USPC .......................................................... 370/329
See application file for complete search history.

(56) References Cited

U.S. PATENT DOCUMENTS

| | | | | |
|---|---|---|---|---|
| 2021/0167881 A1* | 6/2021 | Zinner | ..................... | H04L 12/40 |
| 2021/0314078 A1* | 10/2021 | Zinner | ..................... | H04L 12/40 |
| 2023/0019699 A1* | 1/2023 | Zinner | ..................... | H04L 12/40 |
| 2023/0179313 A1* | 6/2023 | Wang | ..................... | H04J 3/0667 |
| | | | | 370/503 |

FOREIGN PATENT DOCUMENTS

| | | |
|---|---|---|
| CN | 102457346 A | 5/2012 |
| CN | 103023595 A | 4/2013 |
| CN | 103067111 A | 4/2013 |
| CN | 110324889 A | 10/2019 |
| CN | 111385050 A | 7/2020 |
| WO | WO-2017/133478 A1 | 8/2017 |

OTHER PUBLICATIONS

Extended European Search Report for EP Appl. No. 20955756.0, dated Apr. 8, 2024 (13 pages).
Nokia et al., "KI#3B: Sol#7: Updates on Solution #7 for Exposure of Time Synchronization", SA WG2 Meeting #140E, Sep. 2, 2020 (6 pages).
Qualcomm Incorporated, "(g)PTP GM support by DS-TT", 3GPP TSG-WG SA2 Meeting #139E e-meeting, S2-2004211, Jun. 5, 2020, Elbonia (3 pages).
ZTE, "KI#3B, sol#9, Update the solution on BMCA", SA WG2 Meeting #S2-140E, S2-2005158, Sep. 2, 2020, Electronic, Elbonia (3 pages).
International Search Report and Written Opinion for PCT Appl. No. PCT/CN2020/119577, mailed Jun. 24, 2021 (6 pages).

* cited by examiner

*Primary Examiner* — Robert J Lopata
(74) *Attorney, Agent, or Firm* — Foley & Lardner LLP

(57) ABSTRACT

A wireless communication method for use in a network node is disclosed. The method comprises receiving, from a communication node, a message indicating a capability of being a grand master clock, and transmitting, to the communication node, announce information associated with a first announce message based on the capability.

18 Claims, 9 Drawing Sheets

METHODS, SYSTEMS AND APPARATUSES FOR 5G TIME SYNCHRONIZATION

This application is a continuation of PCT/CN2020/119577, filed Sep. 30, 2020, the content of which is incorporated herein by reference in its entirety.

TECHNICAL FIELD

This document is directed generally to wireless communications.

BACKGROUND

In the TSN (Time sensitive network), which uses the 802.1AS, or some network, which uses IEEE 1588 protocol, all entities shall keep time synchronization with GM (grand master) clock. In order to achieve this goal, the BMCA (Best Master Clock Algorithm) may be used to create a time synchronization spanning tree and determine the GM clock. With the BMCA, the bridge can determine the GM clock information and port state of every port of the bridge.

There are two method for BMCA: a static configuration, e.g external configuration method in TSN specification 802.1AS; and a dynamic computation.

However, currently, when the time source is inside the 5GS (5G system), i.e. the GM clock is inside of device side TSN translator (DS-TT) or network side TSN translator (NW-TT), how the DS-TT or NW-TT performs the BMCA is not defined.

SUMMARY

This document relates to methods and devices for time synchronization, in particular for 5G time synchronization.

The present disclosure relates to a wireless communication method for use in a network node. The method comprises:
  receiving, from a communication node, a message indicating a capability of being a grand master clock, and
  transmitting, to the communication node, announce information associated with a first announce message based on the capability.

Various embodiments may preferably implement the following features:

Preferably or in some implementations, the message indicates that the communication node is capable of being the grand master clock.

Preferably or in some implementations, the method further comprises:
  receiving, from the communication node, master clock information based on a second announce message, and
  transmitting, to the communication node, announce information associated with a third announce message based on the master clock information.

Preferably or in some implementations, the master clock information comprises the second announce message or information elements in the second announce message.

Preferably or in some implementations, the announce information associated with the first and/or the third announce message comprises the first and/or the third announce message.

Preferably or in some implementations, wherein the announce information associated with the first and/or the third announce message comprises the first and/or the third announce message.

Preferably or in some implementations, the announce information associated with the first and/or the third announce message further comprises assist information associated with the transmission of the first and/or third announce message.

Preferably or in some implementations, the assist information comprises at least one of an interval of transmitting the first and/or third announce message, a send time of transmitting the first and/or third announce message or the number of consecutive transmissions of transmitting the first and/or third announce message in one interval of transmitting the first and/or third announce message.

Preferably or in some implementations, the announce information associated with the first and/or the third announce message comprises message generating information for generating the first and/or third announce message.

Preferably or in some implementations, the message generating information comprises at least one of a clock identity, a clock accuracy, a domain number, a sequence identifier, a grand master clock priority, a grand master clock identifier, a time source or a path trace.

Preferably or in some implementations, the message generating information comprises assist information for transmitting the first and/or third announce message.

Preferably or in some implementations, the assist information comprises at least one of an interval of transmitting the first and/or third announce message, a send time of transmitting the first and/or third announce message or the number of consecutive transmissions of transmitting the first and/or third announce message in one interval in one interval of transmitting the first and/or third announce message.

Preferably or in some implementations, the communication node comprises at least one of a device side time sensitive networking translator, a user equipment, a network side time sensitive networking translator or a user plane function.

Preferably or in some implementations, the network node comprises an application function or a network exposure function.

The present disclosure relates to a wireless communication method for use in a communication node. The method comprises:
  transmitting, to a network node, a message indicating a capability of being a grand master clock,
  receiving, from the network node, announce information associated with a first announce message, and
  transmitting the first announce message based on the announce information associated with the first announce message.

Various embodiments may preferably implement the following features:

Preferably or in some implementations, the message indicates that the communication node is capable of being the grand master clock.

Preferably or in some implementations, the method further comprises:
  receiving a second announce message,
  transmitting, to the network node, master clock information of the second announce message based on at least one of the first announce message and the second announce message,
  receiving, from the network node, announce information associated with a third announce message, and
  transmitting the third announce message based on the announce information associated with the third announce message.

Preferably or in some implementations, the master clock information is transmitted to the network node when a priority of the first announce message is lower than a priority of the second announce message.

Preferably or in some implementations, the priority of an announce message is associated with at least one of a grandmaster priority of an instance transmitting the announce message, a clock quality of the instance transmitting the announce message, a clock identity of the instance transmitting the announce message, a time resource of the instance of transmitting the announce message or the number of instances traversed by the announce message between the grand master clock and the instance transmitting the announce message.

Preferably or in some implementations, the master clock information comprises the second announce message or information elements in the second announce message.

Preferably or in some implementations, the announce information associated with the first and/or third announce message comprises the first and/or third announce message.

Preferably or in some implementations, the announce information further comprises assist information associated with the transmission of the first and/or the third announce message.

Preferably or in some implementations, the assist information comprises at least one of an interval of transmitting the first and/or third announce message, a send time of transmitting the first and/or third announce message or the number of consecutive transmissions of transmitting the first and/or third announce message in one interval of transmitting the first and/or third announce message.

Preferably or in some implementations, the announce information associated with the first and/or the third announce message comprises message generating information for generating the first and/or third announce message.

Preferably or in some implementations, the message generating information comprises at least one of a clock identity, a clock accuracy, a domain number, a sequence identifier, a grand master clock priority, a grand master clock identifier, a time source or a path trace.

Preferably or in some implementations, the message generating information comprises assist information of transmitting the first and/or third announce message.

Preferably or in some implementations, the assist information comprises at least one of an interval of transmitting the first and/or third announce message, a send time of transmitting the first and/or third announce message or the number of consecutive transmissions of transmitting the first and/or third announce message in one interval of transmitting the first and/or third announce message.

Preferably or in some implementations, the communication node comprises at least one of a device side time sensitive networking translator, a user equipment, a network side time sensitive networking translator or a user plane function.

Preferably or in some implementations, the network node comprises at least one of an application function or a network exposure function.

The present disclosure relates to a network node comprising a communication unit configured to:
receive, from a communication node, a message indicating a capability of being a grand master clock, and
transmit, to the communication node, announce information associated with a first announce message based on the capability.

Various embodiments may preferably implement the following feature:

Preferably or in some implementations, the network node further comprises a processor configured to perform a wireless communication method recited in any one of the foregoing methods.

The present disclosure relates to a communication node comprising a communication unit configured to:
transmit, to a network node, a message indicating a capability of being a grand master clock,
receive, from the network node, announce information associated with a first announce message, and
transmit the first announce message based on the announce information associated with the first announce message.

Various embodiments may preferably implement the following feature:

Preferably or in some implementations, the communication node further comprises a processor configured to perform a wireless communication method recited in any one of the foregoing methods.

The present disclosure relates to a computer program product comprising a computer-readable program medium code stored thereupon, the code, when executed by a processor, causing the processor to implement a wireless communication method recited in any one of the foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
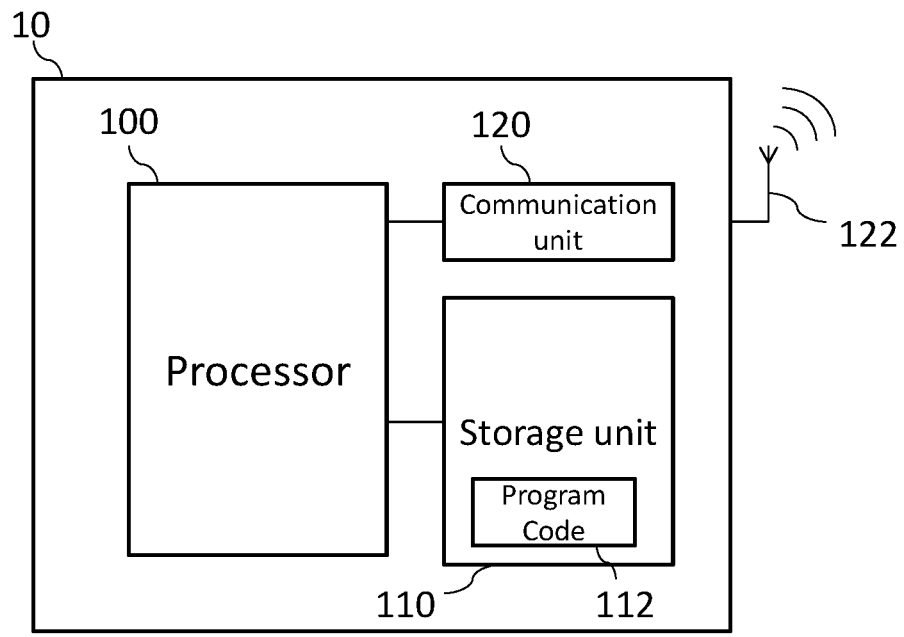
FIG. 1 shows an example of a schematic diagram of a wireless terminal according to an embodiment of the present disclosure.

FIG. 1 relates to a schematic diagram of a wireless terminal 10 in an embodiment of the present disclosure. The wireless terminal 10 may be a communication device, a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 110 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100.

In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
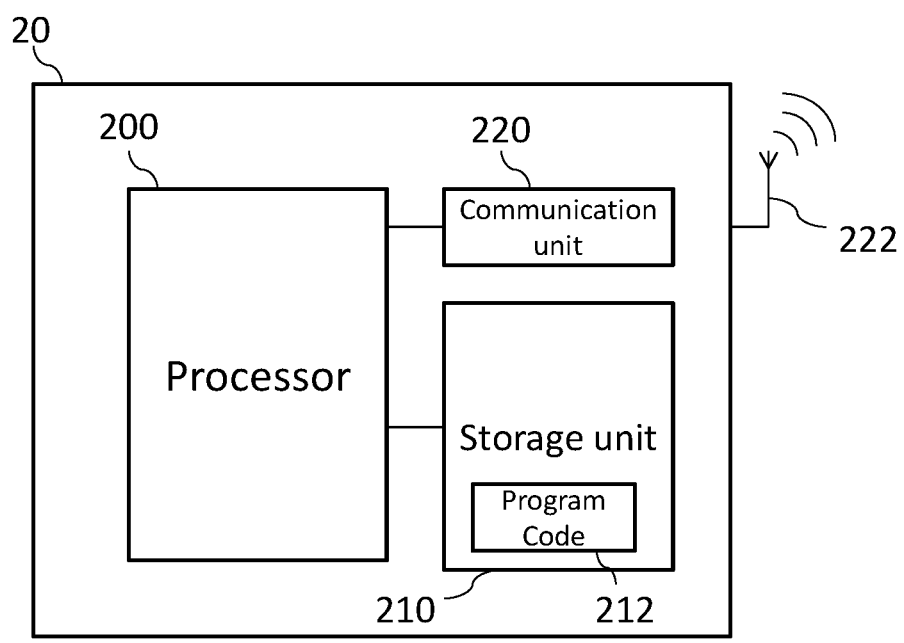
FIG. 2 shows an example of a schematic diagram of a wireless network node according to an embodiment of the present disclosure.

FIG. 2 relates to a schematic diagram of a wireless network node 20 in an embodiment of the present disclosure. The wireless network node 20 may be a communication device, a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node may comprise (perform) at least one network function such as an access and mobility management function (AMF), a session management function (SMF), a user plane function (UPF), a policy control function (PCF), an application function (AF), an application protocol client function, an application protocol server function, a port management registration and allocation function, a port allocation function, etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 210 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

Figure 3:
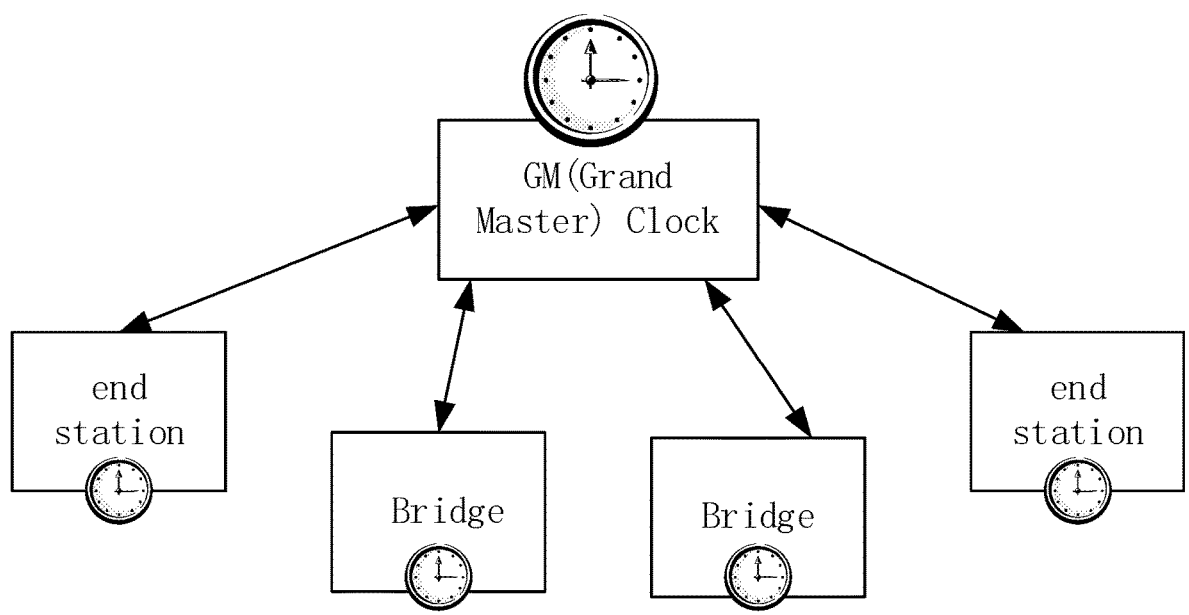
FIG. 3 shows a schematic diagram of time synchronization in a network according to an embodiment of the present disclosure.
Figure 4:
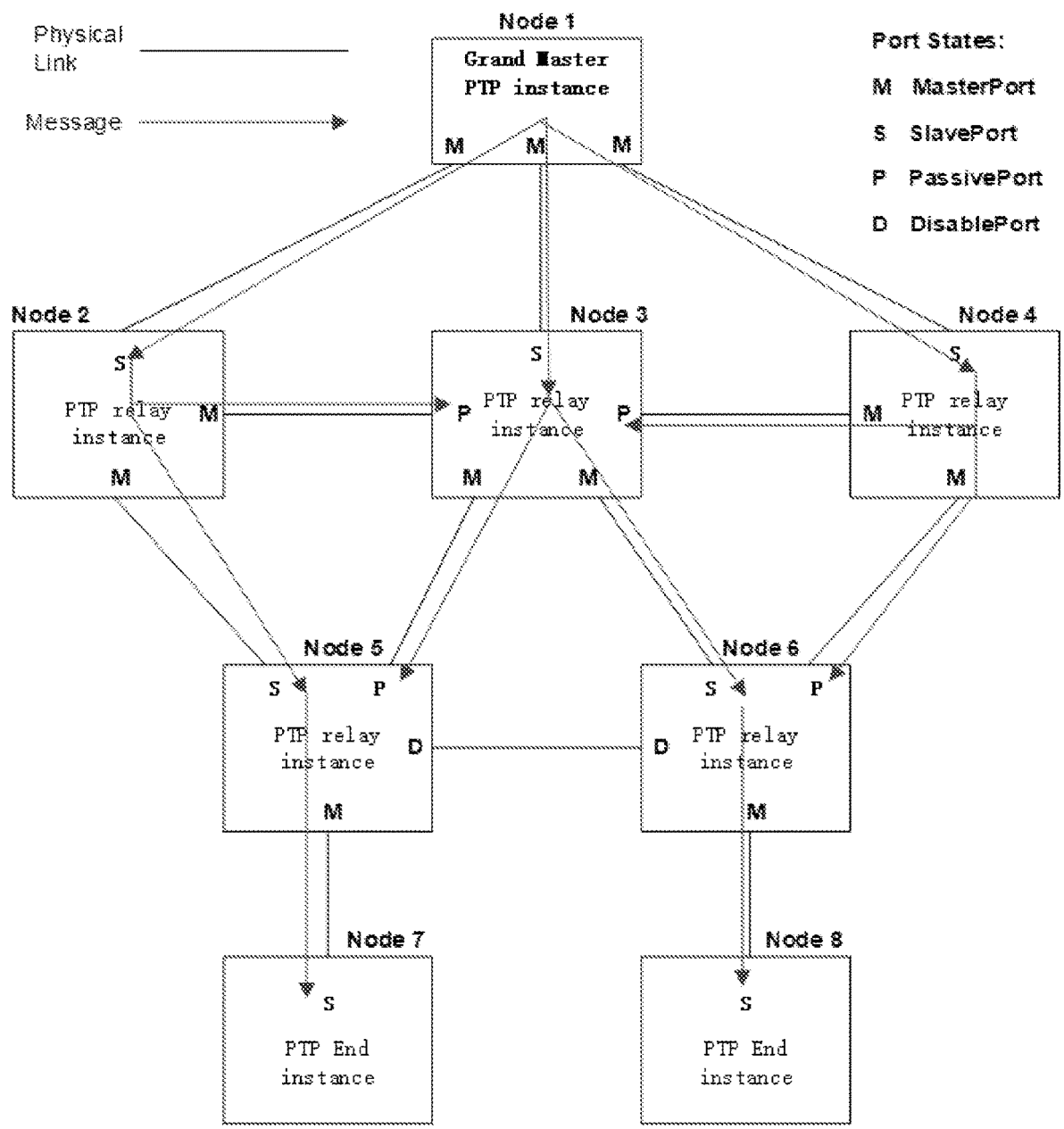
FIG. 4 shows a schematic diagram of a time synchronization spanning tree according to an embodiment of the present disclosure.
Figure 5:
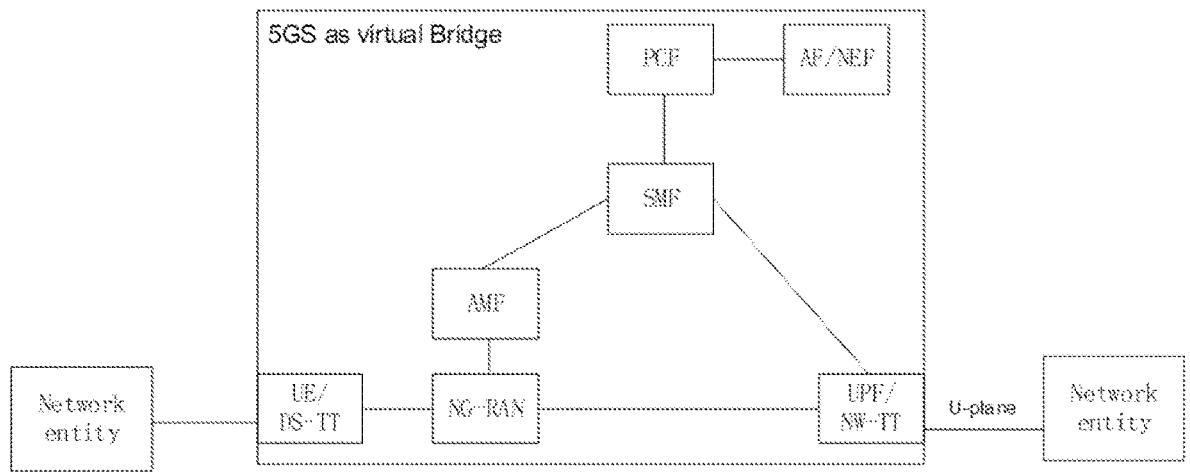
FIG. 5 shows a schematic diagram of 5GS supporting TSN as a virtual bridge according to an embodiment of the present disclosure.

With reference to FIGS. 3 to 5, various embodiments of the present disclosure are described.

In the TSN network, the 802.1AS protocol is used to perform time synchronization. In some other networks, the IEEE 1588 protocol may be used to perform time synchronization.

FIG. 3 shows a schematic diagram of time synchronization in a network according to an embodiment of the present disclosure.

In FIG. 3, there is a Grand Master (GM) clock in the network (e.g. the TSN and/or the network using the IEEE 1588 protocol). All the network entities (e.g. end station, Bridge, etc.) are synchronized with the GM clock in time. After time synchronization, all entities within the network have the same clock time.

In the TSN network, the gPTP (generic Precise Time Protocol) is used in the 802.1AS protocol. In the network with the IEEE 1588 protocol, the PTP (Precise Time Protocol) is used. The PTP and gPTP are quite similar. Specially, the same announce message, which is used for BMCA, is used in both PTP and gPTP.

All messages of the PTP and gPTP are multicast frames/packets, i.e. the destination address of the frame/packet is a multicast address. Because there may be multiple paths between two nodes in the network to add robustness, it is inevitable to create message loops.

The BMCA is used in both the IEEE 802.1AS and IEEE 1588 protocol. The BMCA is used to create time synchronization tree to avoid the message loops. If there are multiple GM clock candidates, the BMCA is also used to determine which GM clock candidate is selected as the GM clock.

In addition, both PTP and gPTP use the announce message to achieve dynamic BMCA between all the nodes.

The GM clock entity periodically sends the announce message to the network entities in the network. The network entity that receives the announce message runs BMCA to determine the GM clock and its port state. Next, the network entity modifies the announce message and send the modified announce message to next hop. After the announce message is transmitted (flooded) to the whole network, a time synchronization spanning tree is created in which there is no message loop.

FIG. 4 shows a schematic diagram of a time synchronization spanning tree according to an embodiment of the present disclosure. In particular, FIG. 4 is an example of the time synchronization of a spanning tree as a result of running BMCA.

In FIG. 4, the arrows indicate the message flow, wherein the lines indicate the physical link between the nodes. The port states are indicated as M for a Master port, as S for a Slave port, as P as a Passive port, and D as a Disable port.

The GM clock (Node 1) is the root of the spanning tree and sends the (g)PTP message out via the ports which state is the Master port M.

There is only one port which state is Slave port S in the other network entities. When one network entity receives the (g)PTP message from the port which state is Slave port S, this network entity sends the received (g)PTP message out via the port(s) which states are Master ports M. Note that, the (g)PTP message received via the Slave port S will not be sent via Passive ports P or Disable ports D. If a node (e.g. network entity) receives the (g)PTP message from a port other than a Slave port S, the node discards the received (g)PTP message.

As apparent from FIG. 4, there is no message loop in the spanning tree hierarchy.

Otherwise, without spanning tree, node 1 sends a message to node 2, node 2 sends the message to node 3, and node 3 may send the message to node 1. That is, a message loop is created.

In the 3GPP network, the above-mentioned networks may be supported, i.e. TSN network or network using IEEE 1588. The 5G system simulates a bridge to these networks, so called virtual/logical bridge mode. This "logical" TSN Bridge includes TSN Translator (TT) functionality for interoperation between the TSN System and the 5G System. The DS-TT (Device-side TT) is at the UE side and NW-TT (network-side TT) is at the UPF side. The 5G System specific procedures in 5GC and RAN, wireless communication links, etc. remain hidden from these networks, i.e. TSN or network using IEEE 1588. The TT may not only inter-operate with TSN, but also may inter-operate with the network using IEEE 1588.

The 5GS logical bridge is per UPF granularity. When the UE/DS-TT requests to establish the PDU session, the UPF/NW-TT allocates the unique Bridge Port number for each PDU session. All the PDU sessions, which are allocated with a port, under the same UPF, consist of one 5GS virtual Bridge.

Therefore, in the 5GS virtual Bridge, there are multiple ports, some are the ports for the PDU session, the other ports are the ports in the NW-TT.

FIG. 5 shows a schematic diagram of 5GS supporting TSN as a virtual bridge according to an embodiment of the present disclosure.

Next, it is described how the DS-TT or NW-TT may run the BMCA when the time source is inside the 5GS, i.e. when the GM clock may be in the DS-TT or NW-TT.

The communication between UPF/NW-TT and AF/NEF, UE/DS-TT and AF/NEF is via PMIC in accordance with some embodiments.

According to an embodiment, the UPF/NW-TT or UE/DS-TT informs the AF/NEF about its capability, i.e. whether it can be the GM clock or not.

The NEF/AF referred to herein means the AF or NEF of the network side may perform the respective functions.

The AF/NEF creates (e.g. generates) the announce message and sends the announce message and assistant information to the UPF/NW-TT or the UE/DS-TT.

The assistant information may include the frequency (e.g. interval) of sending the announce message periodically.

The UPF/NW-TT or UE/DS-TT sends the announce message out accordingly.

When the UPF/NW-TT or UE/DS-TT receives another announce message from another GM clock candidate, it either calculates whether the received GM clock candidate is better than that of itself according to BMCA and the UPF/NW-TT or UE/DS-TT may inform the AF/NEF when the other GM clock candidate is better than that of itself, or sends the received announce message to the AF/NEF.

If the AF/NEF receives the other GM clock candidate information from the DS-TT/NW-TT, it may create a new announce message and sends the new announce message and assistant information to the UPF/NW-TT or the UE/DS-TT.

Subsequently, the UPF/NW-TT or UE/DS-TT sends the new announce message out accordingly.

The new announce message may cause the GM clock in the DS-TT/NW-TT to be better than the previous GM clock candidate.

According to an embodiment, the AF/NEF creates and sends the BMCA assistant information to the UPF/NW-TT or the UE/DS-TT.

The BMCA assistant information may include all of the required information on how to create and send the announce message, e.g., the clock Identity, clock accuracy, time interval to send, etc.

The UPF/NW-TT or the UE/DS-TT creates the announce message and sends it out accordingly.

When the UE/DS-TT or UPF/NW-TT receives another announce message from another GM clock candidate, it either calculates whether the received GM clock candidate is better than that of itself according to BMCA and the UE/DS-TT or UPF/NW-TT may inform the AF/NEF when the other GM clock candidate is better than that of itself, or sends the received announce message to the AF/NEF.

If the AF/NEF receives the other GM clock candidate information from the DS-TT/NW-TT, it may create a new BMCA assistant information and sends it to the UPF/NW-TT or the UE/DS-TT.

Subsequently, the UPF/NW-TT or UE/DS-TT creates a new announce message and sends it out in accordance with the new BMCA assistant information.

The new announce message may cause the GM clock in the DS-TT/NW-TT to be better than the previous GM clock candidate.

Figure 6:
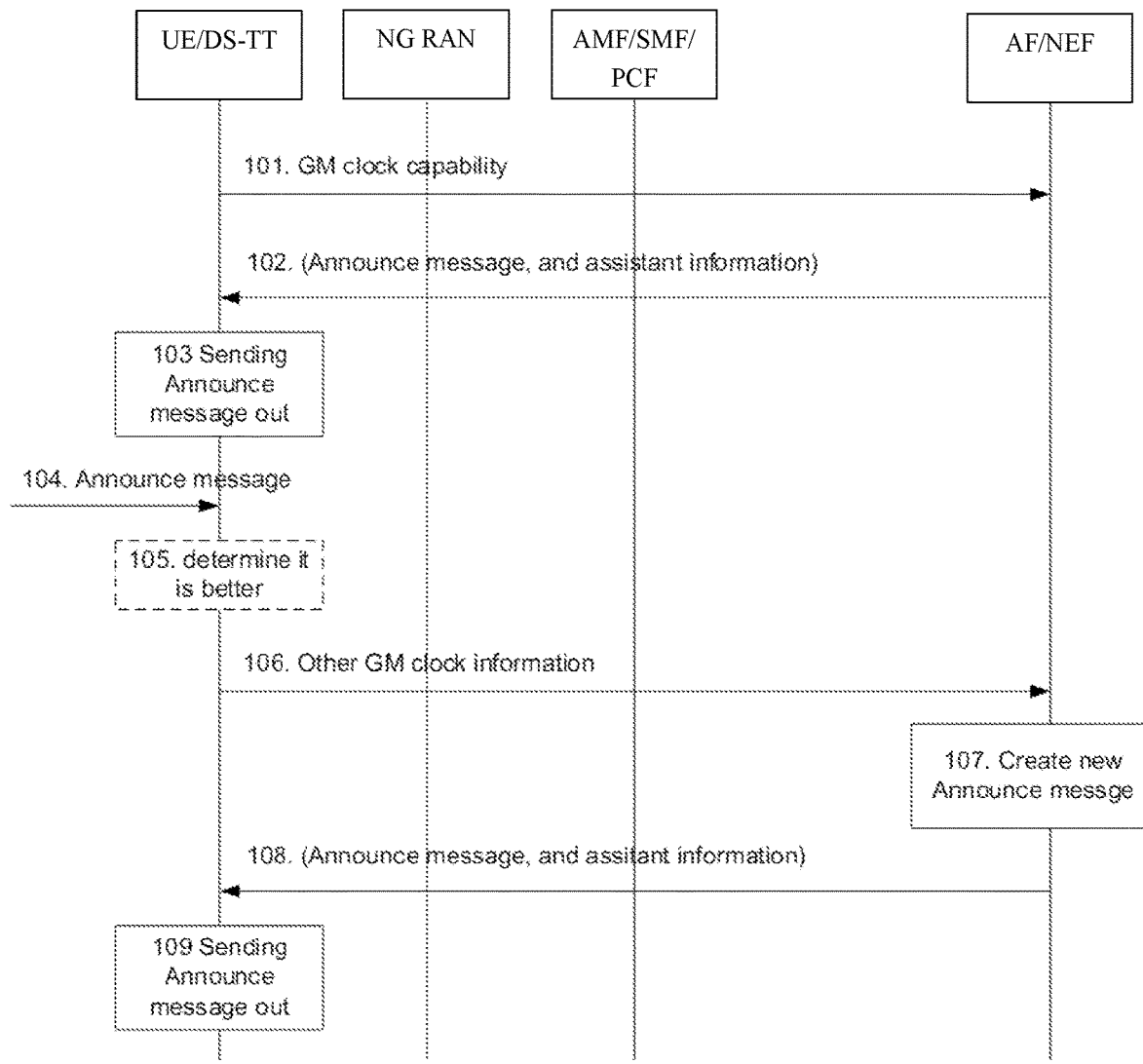
FIG. 6 shows a flowchart where the DS-TT acts as a GM clock and the AF/NEF creating the announce message according to an embodiment of the present disclosure.

FIG. 6 shows a flowchart where the DS-TT acts as a GM clock and the AF/NEF creating the announce message according to an embodiment of the present disclosure.

In particular, FIG. 6 shows how the 5GS informs the DS-TT about sending the announce message:

In step 101, the UE/DS-TT sends its GM clock capability to the AF/NEF via PMIC. The PMIC between UE/DS-TT and AF/NEF is transparently transferred via NG-RAN, AMF, SMF and PCF.

In step 102, the AF/NEF creates the announce message and sends the announce message and assistant information to the UE/DS-TT via PMIC (Port Management information Container). The assistant information may include the frequency to send the announce message.

In step 103, the UE/DS-TT sends the announce message out according to the received announce message and the assistant information.

According to some embodiments step 104-109 are optionally performed.

In step 104, the UE/DS-TT receives an announce message which is created by another GM clock candidate.

In step 105, the UE/DS-TT may determine whether the other GM clock candidate is better than that of itself according to BMCA. If the other GM clock candidate is not better, the UE/DS-TT discards the message, which is an optional step according to some embodiments.

In step 106, the UE/DS-TT sends the other GM clock information of another GM clock candidate to the AF/NEF via PMIC when the GM clock information of the other GM clock candidate is better than that of itself. The GM clock information of another GM clock information may be the received announce message, or IEs (information elements) in the received announce message.

In step 107, the AF/NEF creates a new announce message accordingly.

In step 108, the AF/NEF sends the new announce message and assistant information to UE/DS-TT via PMIC.

In step 109, the UE/DS-TT sends the new announce message out in accordance with the new received announce message and assistant information.

Figure 7:
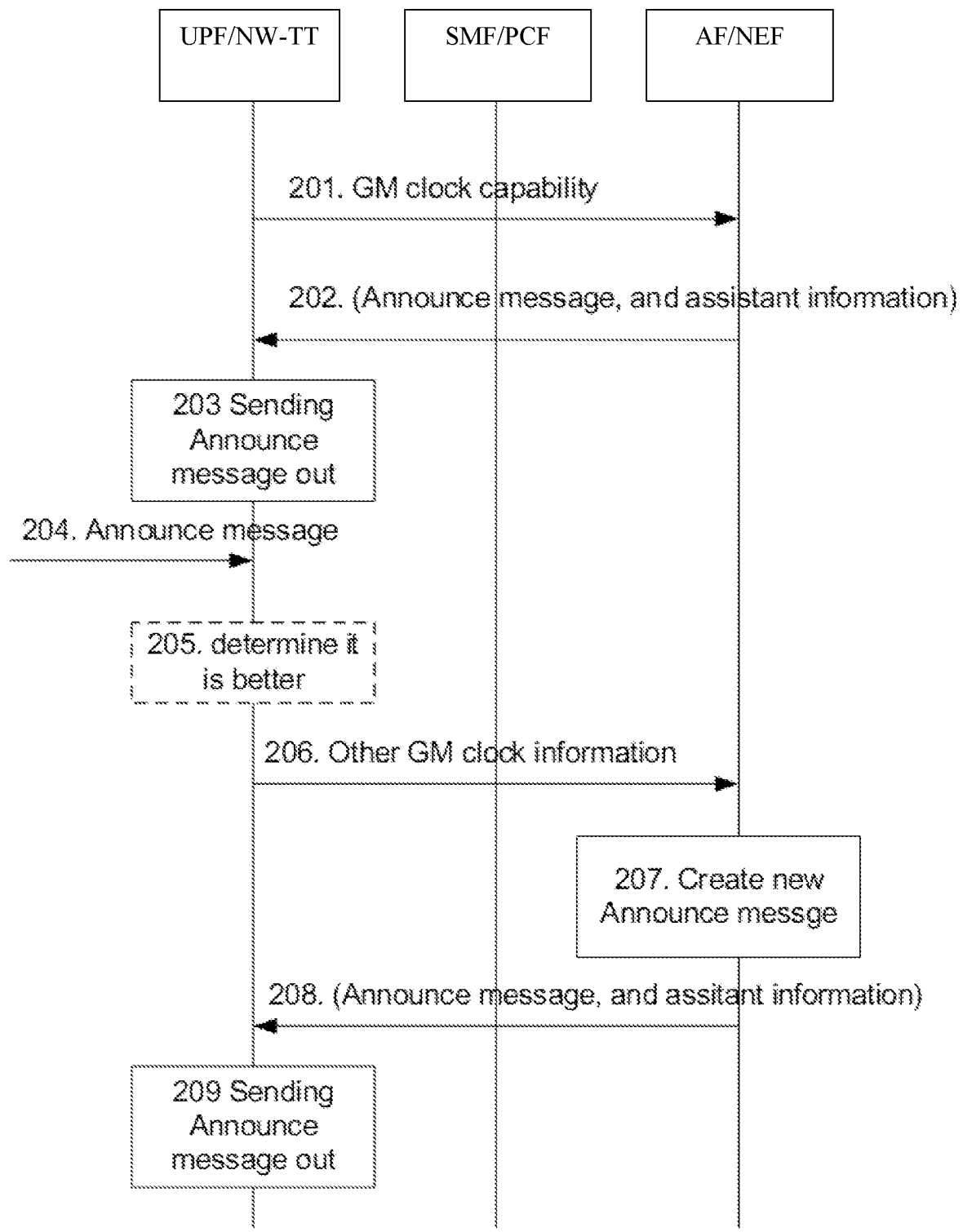
FIG. 7 shows a flowchart where the NW-TT acts as a GM clock and the AF/NEF creating the announce message according to an embodiment of the present disclosure.

FIG. 7 shows a flowchart where the NW-TT acts as a GM clock and the AF/NEF creating the announce message according to an embodiment of the present disclosure.

In particular, FIG. 7 shows how the 5GS informs the NW-TT about sending the announce message.

In step 201, the UPF/NW-TT sends its GM clock capability to the AF/NEF via PMIC. The PMIC between UPF/NW-TT and AF/NEF is transparently transferred via SMF and PCF.

In step 202, the AF/NEF creates the announce message and sends the announce message and assistant information to the UPF/NW-TT via PMIC. The assistant information may include the frequency to send the announce message.

In step 203, the UPF/NW-TT sends the announce message out according to the received announce message and assistant information.

According to some embodiments step 204-209 are optionally performed.

In step 204, the UPF/NW-TT receives an announce message which is created by another GM clock candidate.

In step 205, the UPF/NW-TT may determine whether the other GM clock candidate is better than itself according to BMCA. If the other GM clock candidate is not better, the UPF/NW-TT discards the announce message received from another GM clock candidate, which is an optional step according to some embodiments.

In step 206, the UPF/NW-TT sends the GM clock information of the other GM clock candidate to the AF/NEF via PMIC, e.g., when determining that the other GM clock candidate is better. The other GM clock information may be the received announce message, or IEs (information elements) in the received announce message.

In step 207, the AF/NEF creates a new announce message accordingly.

In step 208, the AF/NEF sends the new announce message and assistant information to the UPF/NW-TT via PMIC.

In step 209, the UPF/NW-TT sends the announce message out in accordance with the new received announce message and assistant information.

Figure 8:
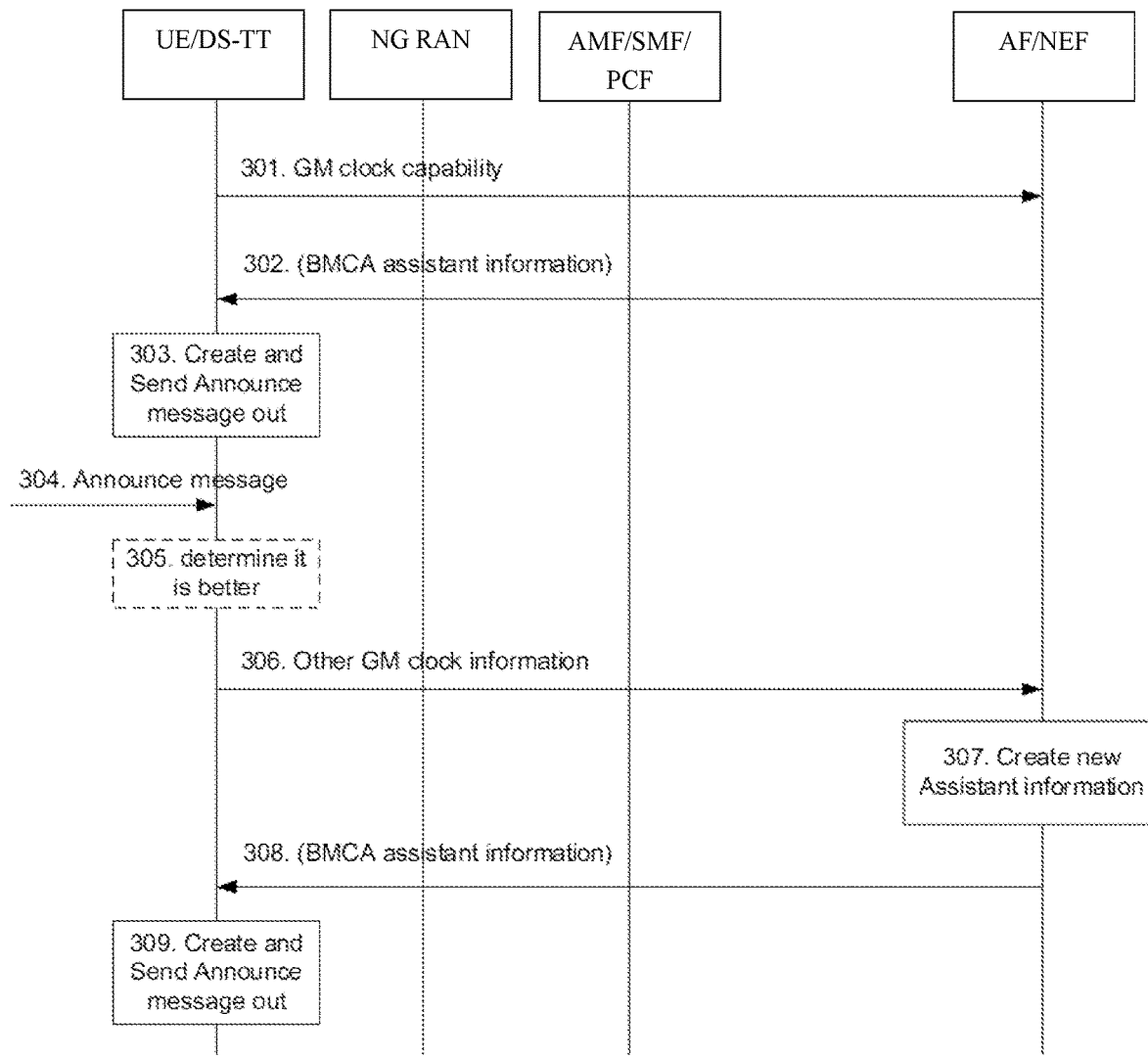
FIG. 8 shows a flowchart where the DS-TT acts as a GM clock and the AF/NEF sending assistant information according to an embodiment of the present disclosure.

FIG. 8 shows a flowchart where the DS-TT acts as a GM clock and the AF/NEF sending assistant information according to an embodiment of the present disclosure.

In particular, FIG. 8 shows how the 5GS informs the DS-TT to create and send the announce message.

In step 301, the UE/DS-TT sends its GM clock capability to the AF/NEF via PMIC. The PMIC between UE/DS-TT and AF/NEF is transparently transferred via NG-RAN, AMF, SMF and PCF.

In step 302, the AF/NEF creates the BMCA assistant information and sends it to the UE/DS-TT via PMIC. The assistant information may include all required information on how to create and send the announce message.

In step 303, the UE/DS-TT creates and sends the announce message out in accordance with the received BMCA assistant information.

According to some embodiments step 304-309 are optionally performed.

In step 304, the UE/DS-TT receives the announce message which is created by another GM clock candidate.

In step 305, the UE/DS-TT may determine whether the other GM clock candidate is better than itself according to BMCA. If the other GM clock candidate is not better, the UE/DS-TT discards the received announce message, which is an optional step according to some embodiments.

In step 306, the UE/DS-TT sends the other GM clock information to the AF/NEF via PMIC, e.g., when determining the other GM clock candidate is better. The other GM clock information may be the received announce message or IEs (information elements) in the received announce message.

In step 307, the AF/NEF creates new BMCA assistant information accordingly.

In step 308, the AF/NEF sends the new BMCA assistant information to the UE/DS-TT via PMIC.

In step 309, the UE/DS-TT creates and sends the announce message out in accordance with the new received BMCA assistant information.

Figure 9:
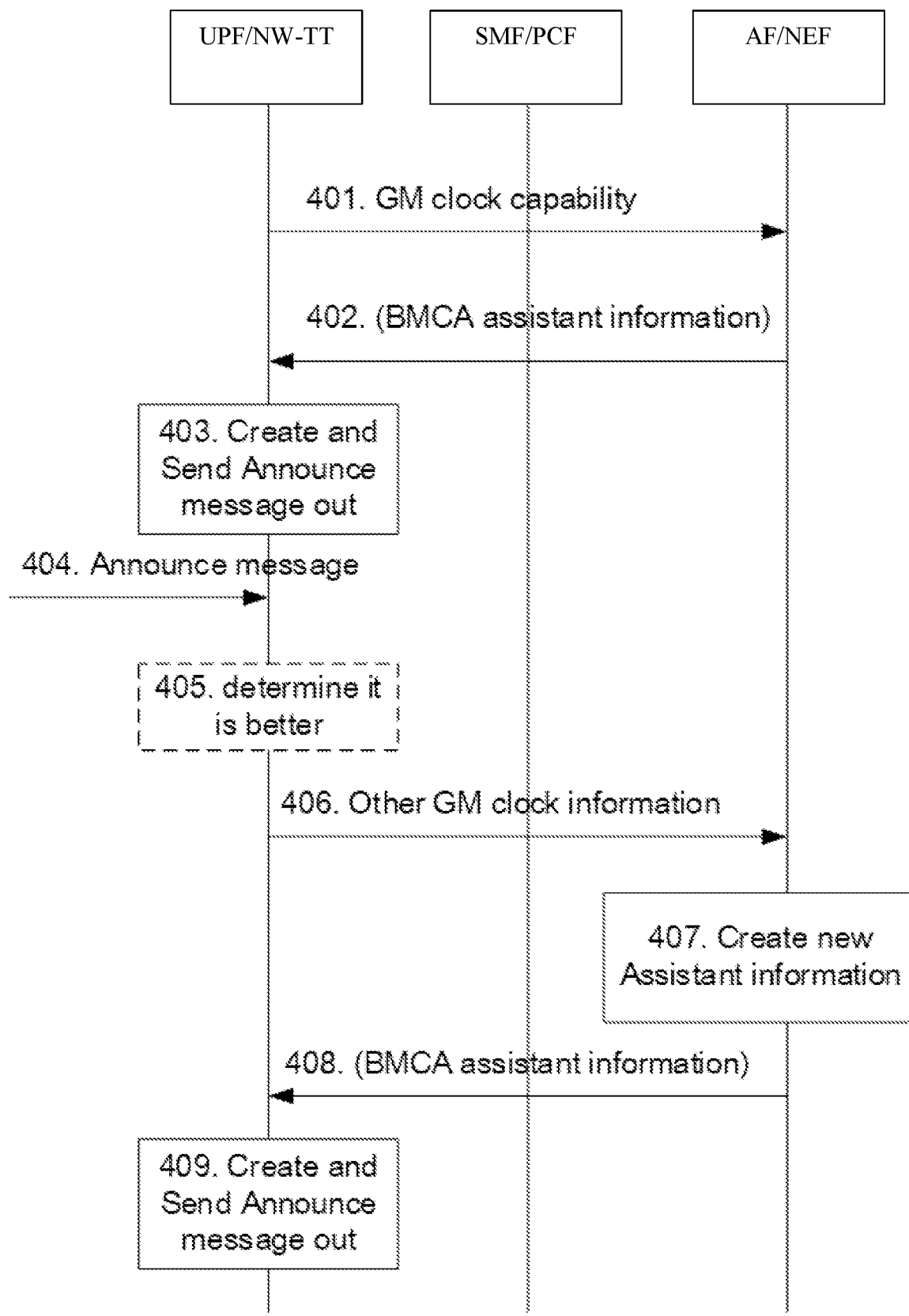
FIG. 9 shows a flowchart where the NW-TT acts as a GM clock and the AF/NEF sends assistant information according to an embodiment of the present disclosure.

FIG. 9 shows a flowchart where the NW-TT acts as a GM clock and the AF/NEF sends assistant information according to an embodiment of the present disclosure.

In particular, FIG. 9 shows how the 5GS informs the NW-TT to create and send the announce message.

In step 401, the UPF/NW-TT sends its GM clock capability to the AF/NEF via PMIC. The PMIC between UPF/NW-TT and AF/NEF is transparently transferred via NG-RAN, AMF, SMF and PCF.

In step 402, the AF/NEF creates the BMCA assistant information and sends it to the UPF/NW-TT via PMIC. The assistant information may include all required information on how to create and send the announce message.

In step 403, the UPF/NW-TT creates and sends the announce message out in accordance with the received BMCA assistant information.

According to some embodiments step 404-409 are optionally performed.

In step 404, the UPF/NW-TT receives an announce message which is created by another GM clock candidate.

In step 405, the UPF/NW-TT may determine whether the other GM clock candidate is better than itself according to BMCA. If the other GM clock candidate is not better, the UPF/NW-TT discards the received announce message, which is an optional step according to some embodiments.

In step 406, the UPF/NW-TT sends the other GM clock information to the AF/NEF via PMIC, e.g., when determining the other GM clock candidate is better. The other GM clock information may be the received announce message or IEs (information elements) in the received announce message.

In step 407, the AF/NEF creates new BMCA assistant information accordingly.

In step 408, the AF/NEF sends the new BMCA assistant information to the UPF/NW-TT via PMIC.

In step 409, the UPF/NW-TT creates and sends the announce message out in accordance with the new received BMCA assistant information.

Figure 10:
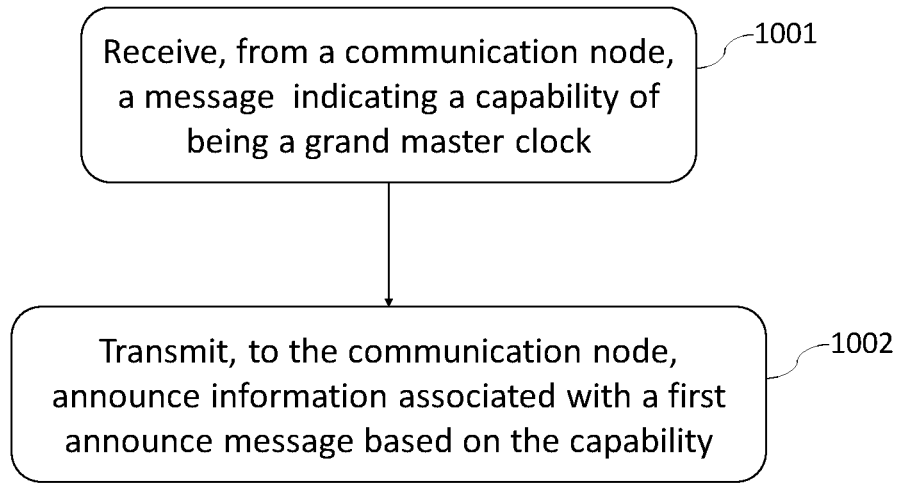
FIG. 10 shows a flowchart of a process according to an embodiment of the present disclosure.

FIG. 10 shows a flowchart of a process according to an embodiment of the present disclosure. The process shown in FIG. 10 may be used in a network node (e.g. AF and/or NEF or network node comprising and/or performing the functionalities of AF and/or NEF) and comprises the following steps:

Step 1001: Receive, from a communication node, a message indicating a capability of being a grand master clock.

Step 1002: Transmit, to the communication node, announce information associated with a first announce message based on the capability.

More specifically, the network node may receive a message from a communication node (e.g. UE and/or DS-TT and/or UPF and/or NW-TT), wherein the message is configured to indicate a capability of (the communication node) being a grand master clock (e.g. in an spanning tree, a clock hierarchy or a time domain). Based on the capability indicated by the message, the network node transmits announce information associated with (e.g. corresponding to or related to) a first announce message to the communication node.

In the present disclosure, "associated with" may be equal to "corresponding to" or "related to".

In an embodiment, the message indicates that the communication node is capable of being the grand master clock.

In an embodiment, the network node may receive master clock information based on a second announce message from the communication node. For example, the communication node may receive the second announce message from another communication node. Based on the master clock information, the network node transmits announce information associated with a third announce message to the communication node.

In an embodiment, the master clock information comprises the second announce message or information elements in the second announce message.

In an embodiment, the announce information associated with the first announce message comprises the first announce message. In addition, the announce information associated with the first announce message may further comprise assist information of transmitting the first announce message, wherein the assist information associated with the first announce information comprises at least one of an interval (e.g. frequency or period) of transmitting the first announce message, a send time of transmitting the first announce message (e.g. announceSendTime) or the number of consecutive transmissions of transmitting the first announce message in one interval of transmitting the first announce message (e.g. numberAnnounceTransmissions).

Similarly, the announce information associated with the third announce message comprises the first announce message according to an embodiment of the present disclosure. In addition, the announce information associated with the third announce message may further comprise assist information of transmitting the third announce message, wherein the assist information associated with the third announce information comprises at least one of an interval (e.g. frequency or period) of transmitting the third announce message, a send time of transmitting the third announce message or the number of consecutive transmissions of transmitting the third announce message in one interval of transmitting the third announce message.

In an embodiment, the announce information associated with the first announce message comprises message generating information for generating the first announce message. Similarly, the announce information associated with the third announce message comprises message generating information for generating the third announce message according to an embodiment of the present disclosure. For example, the message generating information comprises at least one of a clock identity, a clock accuracy, a domain number, a sequence identifier, a grand master clock priority, a grand master clock identifier, a time source or a path trace. (e.g. domainNumber, sequenceId, grandmasterPriority, grandmasterClockQuality, grandmasterPriority2, grandmasterIdentity, timeSource, path trace)

According to an embodiment of the present disclosure, the message generating information comprises assist information for transmitting the first and/or third announce message, wherein the assist information comprises at least one of an interval (e.g. frequency or period) of transmitting the first and/or third announce message, a send time of transmitting the first and/or third announce message or the number of consecutive transmissions of transmitting the first and/or third announce message in one interval of transmitting the first and/or third announce message.

Figure 11:
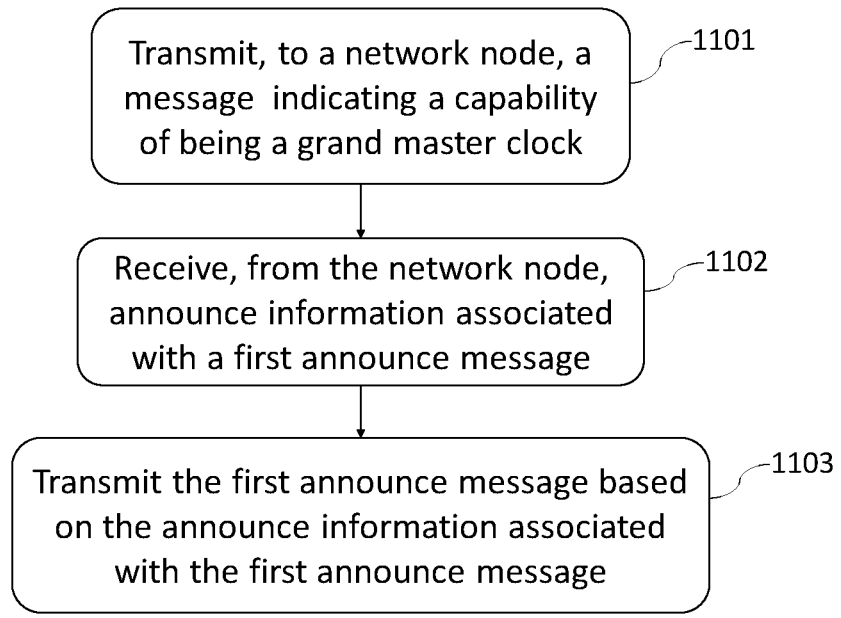
FIG. 11 shows a flowchart of a process according to an embodiment of the present disclosure.

FIG. 11 shows a flowchart of a process according to an embodiment of the present disclosure. The process shown in FIG. 11 may be used in a communication node (e.g. UE and/or DS-TT and/or UPF and/or NW-TT and/or communication node comprising and/or performing the functionalities of UE and/or DS-TT and/or UPF and/or NW-TT) and comprises the following steps:

Step 1101: Transmit, to a network node, a message indicating a capability of being a grand master clock.

Step 1102: Receive, from the network node, announce information associated with a first announce message.

Step 1103: Transmit the first announce message based on the announce information associated with the first announce message.

Specifically, the communication node transmits a message to a network node (e.g. AF and/or NEF or network node comprising and/or performing functionalities of AF and/or NEF) thereby indicating a capability of being a grand master clock. Next, the communication node receives announce information associated with a first announce message, e.g., in response to the message. Based on the announce message associated with the first announce message, the communication node transmits the first announce message, e.g., to other communication node(s).

In an embodiment, the message indicates that the communication node is capable of being the grand master clock.

In an embodiment, the communication node receives a second announce message, e.g., from another communication node. Based on the first announce message and/or the second announce message, the communication node transmits master clock information to the network node. Next, the communication node receives announce information associated with a third announce message from the network node and transmits the third announce message based on the announce information associated with the third announce message.

In an embodiment, the communication node may transmit the master clock information based on the second announce message when receiving the second announce message. As an alternative, the communication node may transmit the master clock information based on the second announce message when determining a priority of the first announce message is lower than a priority of the second announce message. That is, the grand master clock corresponding to the second announce message is better than that corresponding to the first announce message (i.e. its own grand master clock). In an embodiment, the priority of one announce message can be determined based on BMCA. For example, the priority of one announce message is associated with at least one of a grandmaster priority of an instance transmitting the announce message, a clock quality of the instance transmitting the announce message, a clock identity of the instance transmitting the announce message, a time resource of the instance of transmitting the announce message or the number of instances traversed by the announce message between the grand master clock and the instance transmitting the announce message.

In an embodiment, when the UE/DS-TT or UPF/NW-TT sends the second announce message to the AF/NEF when receiving the second announce message, the AF/NEF may generate and/or transmit the announce information associated with the third announce message based on the second announce message and/or the first announce message (e.g. based on which one of the second announce message and the first announce message has the GM clock with a higher priority (i.e. better GM clock)).

In an embodiment, the master clock information comprises the second announce message or information elements in the second announce message.

In an embodiment, the announce information associated with the first announce message comprises the first announce message. In addition, the announce information associated with the first announce message may further comprise assist information of transmitting the first announce message, wherein the assist information associated with the first announce information comprises at least one of an interval (e.g. frequency or period) of transmitting the first announce message, a send time of transmitting the first announce message (e.g. announceSendTime) or the number of consecutive transmissions of transmitting the first announce message in one interval of transmitting the first announce message (e.g. numberAnnounceTransmissions).

Similarly, the announce information associated with the third announce message comprises the first announce message according to an embodiment of the present disclosure. In addition, the announce information associated with the third announce message may further comprise assist information of transmitting the third announce message, wherein the assist information associated with the third announce information comprises at least one of an interval (e.g. frequency or period) of transmitting the third announce message, a send time of transmitting the third announce message or the number of consecutive transmissions of transmitting the third announce message.

In an embodiment, the announce information associated with the first announce message comprises message generating information for generating the first announce message. Similarly, the announce information associated with the third announce message comprises message generating information for generating the third announce message according to an embodiment of the present disclosure. For example, the message generating information comprises at least one of a clock identity, a clock accuracy, a domain number, a sequence identifier, a grand master clock priority, a grand master clock identifier, a time source or a path trace. (e.g. domainNumber, sequenceId, grandmasterPriority, grandmasterClockQuality, grandmasterPriority2, grandmasterIdentity, timeSource, path trace)

According to an embodiment of the present disclosure, the message generating information comprises assist information for transmitting the first and/or third announce message, wherein the assist information comprises at least one of an interval of transmitting the first and/or third announce message, a send time of transmitting the first and/or third announce message or the number of consecutive transmissions of transmitting the first and/or third announce message in one interval of transmitting the first and/or third announce message.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a network node, the wireless communication method comprising:
receiving, from a communication node, a message indicating a capability of being a grand master clock, and
transmitting, to the communication node, announce information associated with a first announce message based on the capability,
wherein the announce information associated with at least one of the first announce message or a third announce message comprises message generating information for generating at least one of the first announce message or the third announce message,
wherein the message generating information comprises assist information for transmitting at least one of the first announce message or the third announce message, and
wherein the assist information comprises at least one of an interval of transmitting at least one of the first announce message or the third announce message, a send time of transmitting at least one of the first announce message or the third announce message or the number of consecutive transmissions of transmitting at least one of the first announce message or the third announce message in one interval of transmitting at least one of the first announce message or the third announce message.

2. The wireless communication method of claim 1, wherein the message indicates that the communication node is capable of being the grand master clock.

3. The wireless communication method of claim 1, further comprising:
receiving, from the communication node, master clock information based on a second announce message, and
transmitting, to the communication node, announce information associated with the third announce message based on the master clock information,
wherein the master clock information comprises the second announce message or information elements in the second announce message.

4. The wireless communication method of claim 1, wherein the announce information associated with at least one of the first announce message or the third announce message comprises at least one of the first announce message or the third announce message.

5. The wireless communication method of claim 4, wherein the announce information associated with at least one of the first announce message or the third announce message further comprises assist information associated with the transmission of at least one of the first announce message or the third announce message.

6. The wireless communication method of claim 1, wherein the message generating information comprises at least one of a clock identity, a clock accuracy, a domain number, a sequence identifier, a grand master clock priority, a grand master clock identifier, a time source or a path trace.

7. The wireless communication method of claim 1, wherein the communication node comprises at least one of a device side time sensitive networking translator, a user equipment, a network side time sensitive networking translator or a user plane function, and wherein the network node comprises an application function or a network exposure function.

8. A wireless communication method for use in a communication node, the method comprising:

transmitting, to a network node, a message indicating a capability of being a grand master clock, receiving, from the network node, announce information associated with a first announce message, and transmitting the first announce message based on the announce information associated with the first announce message, wherein the announce information associated with at least one of the first announce message or a third announce message comprises message generating information for generating at least one of the first announce message or the third announce message, wherein the message generating information comprises assist information of transmitting at least one of the first announce message or the third announce message, and wherein the assist information comprises at least one of an interval of transmitting at least one of the first announce message or the third announce message, a send time of transmitting at least one of the first announce message or the third announce message or the number of consecutive transmissions of transmitting at least one of the first announce message or the third announce message in one interval of transmitting at least one of the first announce message or the third announce message.

9. The wireless communication method of claim 8, wherein the message indicates that the communication node is capable of being the grand master clock.

10. The wireless communication method of claim 8, further comprising:

receiving a second announce message, transmitting, to the network node, master clock information of the second announce message based on at least one of the first announce message and the second announce message, receiving, from the network node, announce information associated with the third announce message, and transmitting the third announce message based on the announce information associated with the third announce message.

11. The wireless communication method of claim 10, wherein the master clock information is transmitted to the network node when a priority of the first announce message is lower than a priority of the second announce message, and wherein the priority of an announce message is associated with at least one of a grandmaster priority of an instance transmitting the announce message, a clock quality of the instance transmitting the announce message, a clock identity of the instance transmitting the announce message, a time resource of the instance of transmitting the announce message or the number of instances traversed by the announce message between the grand master clock and the instance transmitting the announce message, wherein the master clock information comprises the second announce message or information elements in the second announce message.

12. The wireless communication method of claim 8, wherein the announce information associated with at least one of the first announce message or the third announce message comprises at least one of the first announce message or the third announce message, wherein the announce information further comprises assist information associated with the transmission of at least one of the first announce message or the third announce message.

13. The wireless communication method of claim 8, wherein the message generating information comprises at least one of a clock identity, a clock accuracy, a domain number, a sequence identifier, a grand master clock priority, a grand master clock identifier, a time source or a path trace.

14. The wireless communication method of claim 8, wherein the communication node comprises at least one of a device side time sensitive networking translator, a user equipment, a network side time sensitive networking translator or a user plane function, wherein the network node comprises at least one of an application function or a network exposure function.

15. A network node, comprising:

at least one processor and a communication unit configured to:

receive, from a communication node, a message indicating a capability of being a grand master clock, and transmit, to the communication node, announce information associated with a first announce message based on the capability, wherein the announce information associated with at least one of the first announce message or a third announce message comprises message generating information for generating at least one of the first announce message or the third announce message, wherein the message generating information comprises assist information for transmitting at least one of the first announce message or the third announce message, and wherein the assist information comprises at least one of an interval of transmitting at least one of the first announce message or the third announce message, a send time of transmitting at least one of the first announce message or the third announce message or the number of consecutive transmissions of transmitting at least one of the first announce message or the third announce message in one interval of transmitting at least one of the first announce message or the third announce message.

16. The network node of claim 15, wherein the message indicates that the communication node is capable of being the grand master clock.

17. A communication node, comprising:

at least one processor and a communication unit configured to:

transmit, to a network node, a message indicating a capability of being a grand master clock, receive, from the network node, announce information associated with a first announce message, and transmit the first announce message based on the announce information associated with the first announce message, wherein the announce information associated with at least one of the first announce message or a third announce message comprises message generating information for generating at least one of the first announce message or the third announce message, wherein the message generating information comprises assist information for transmitting at least one of the first announce message or the third announce message, and wherein the assist information comprises at least one of an interval of transmitting at least one of the first announce message or the third announce message, a send time of transmitting at least one of the first announce message or the third announce message or the number of consecutive transmissions of transmitting at least one of the first announce message or the third announce message in one interval of transmitting at least one of the first announce message or the third announce message.

18. The communication node of claim 17, wherein the message indicates that the communication node is capable of being the grand master clock.

* * * * *